United States Patent [19]

Schwarz et al.

[11] Patent Number: 5,399,182
[45] Date of Patent: Mar. 21, 1995

[54] REACTIVE DYESTUFF RED MIXTURE

[75] Inventors: Max Schwarz, Leverkusen; Joachim Grütze, Odenthal; Dietrich Hildebrand, Odenthal; Joachim Wolff, Odenthal; Frank Stöhr, Odenthal, all of Germany

[73] Assignee: Bayer Aktiengesellschaft, Leverkusen, Germany

[21] Appl. No.: 982,195

[22] Filed: Nov. 25, 1992

[30] Foreign Application Priority Data

Dec. 5, 1991 [DE] Germany ............ 41 40 117.4

[51] Int. Cl.$^6$ .................. C09B 62/50; C09B 67/22
[52] U.S. Cl. ............................ 8/639; 8/549; 8/680; 8/687
[58] Field of Search ............... 8/549, 639, 680, 687

[56] References Cited

U.S. PATENT DOCUMENTS

| | | |
|---|---|---|
| 3,647,778 | 3/1972 | Andrew et al. |
| 4,049,704 | 9/1977 | Jager |
| 4,309,182 | 1/1982 | Koll et al. |
| 4,338,093 | 7/1982 | Hildebrand et al. |
| 4,557,731 | 12/1985 | Sasakura et al. |
| 4,988,803 | 1/1991 | Stohr et al. |
| 5,047,067 | 9/1991 | Miyazaki et al. |

FOREIGN PATENT DOCUMENTS 2226336  6/1990  United Kingdom.

*Primary Examiner*—Johann Richter
*Assistant Examiner*—John Peabody
*Attorney, Agent, or Firm*—Sprung Horn Kramer & Woods

[57] ABSTRACT

Improved reactive dyestuff red mixtures comprise in each case at least one component of the formula 1 and one component of the formula 2 wherein the substituents have the meaning given in the description.

10 Claims, 1 Drawing Sheet

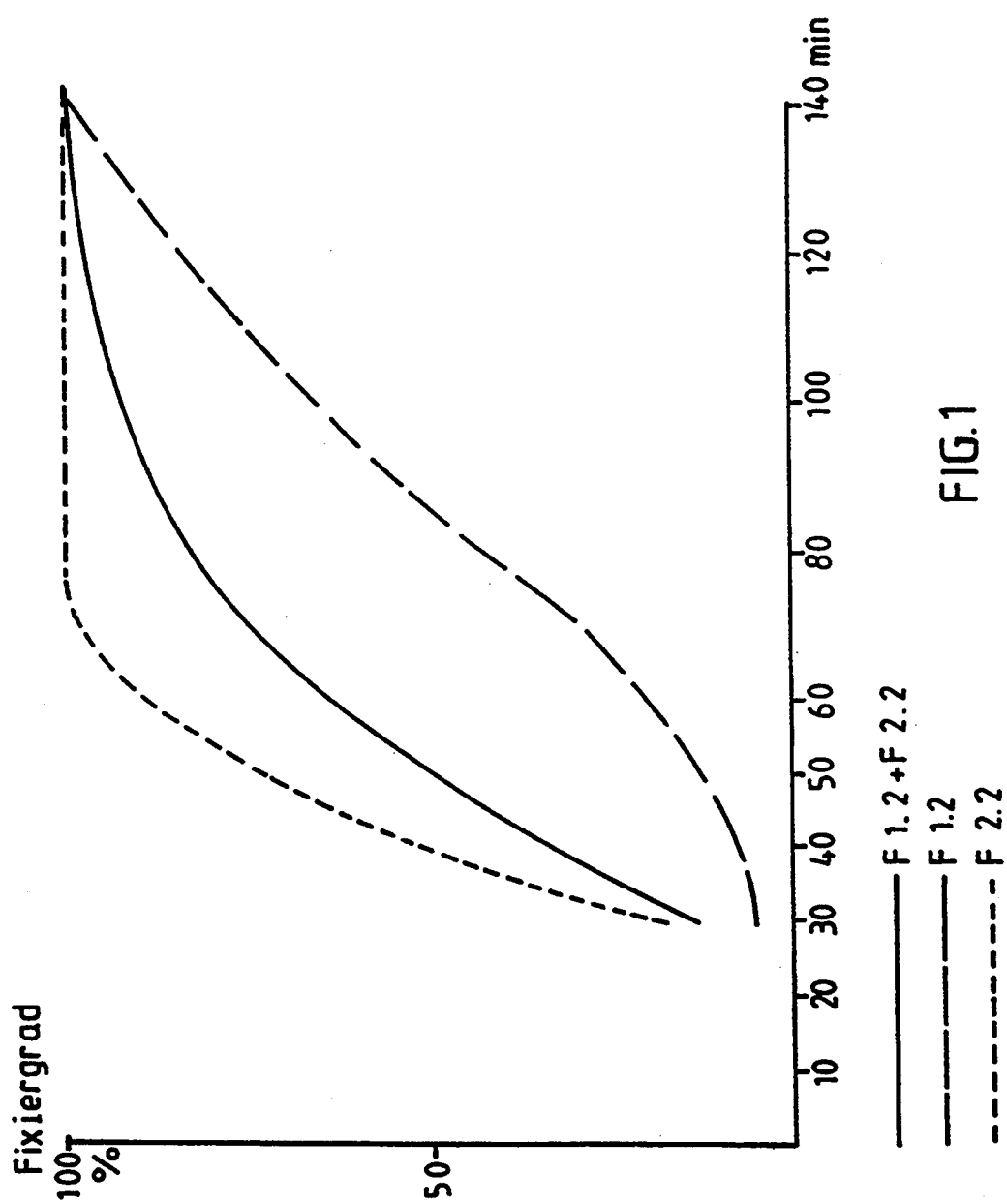

REACTIVE DYESTUFF RED MIXTURE

The invention relates to a new reactive dyestuff red mixture.

Reactive dyestuffs for dyeing cellulose fibres are used, in particular, for dyeing articles which require a high wash-fastness in brilliant shades. It is of particular interest here, inter alia, to establish very clear red shades. There are considerable technical limitations in establishing very clear red shades based on a uniform reactive dyestuff molecule. Known dyestuffs of high brilliance as a rule do not give the desired shade. Combinations selected according to coloristic aspects frequently tend to be absorbed unevenly and to be fixed too rapidly, especially on short liquor dyeing units, so that their use in this respect is limited.

The combinations used in current practice have proved to be unsuitable for many requirements, since the necessary robustness against variable alkali, salt and temperature conditions and different liquor ratios is not achieved. For example, so-called Marlboro red mixtures of in each case one reactive red dyestuff and yellow dyestuff are known, but these have the disadvantage of the shade obtained being dependent on the dyeing temperature, which limits their usability.

In mixtures, the reactivities of the individual components of the mixture should as far as possible be the same or at least similar, in order to ensure that the dyestuffs can be combined during the dyeing operation and thus to achieve a "solid" level appearance of the goods. If reactive dyestuffs have widely different reactivities, they are regarded as belonging to dyestuff ranges which differ from one another and which must be used under different alkali and temperature conditions. In current usage, reactive dyestuffs are divided into three groups on the basis of their different reactivity: high reactivity reactive dyestuffs which can be used for dyeing even below 40° C. are called cold-dyeing dyes, dyestuffs which are used at 40°-60° C. are called warm-dyeing dyes, and dyestuffs which are used in the region of 80° C. are called hot-dyeing dyes. The three groups of dyestuff ranges of different-reactivity are applied by means of process instructions typical of the groups on the basis of their different reactivity and substantivity.

The difference between the use of a warm-dyeing dye and that of a hot-dyeing dye is, for example, a dyeing temperature which is higher by 20°-40° C., an electrolyte concentration which is higher by 40 g/l of sodium chloride and a sodium carbonate concentration of the dye bath which is higher by 10 g/l for the hot-dyeing dye.

Dyestuff mixtures are already known from EP-A-478,503.

BRIEF DESCRIPTION OF THE DRAWINGS

FIG. 1 depicts the firing curves of the individual dyestuffs compared to the dyestuff mixtures.

The invention is based on the object of providing improved reactive dyestuff mixtures which show a uniform course of the fixing curve, which is superior to that of the individual dyestuffs, coupled with a good fixing yield. Furthermore, they should result in a clear red dyeing, have a high solubility and insensitivity to electrolytes and, under variable temperature, alkali and liquor conditions, display reproducible dyeing properties which result in constant shades and are level over the surface.

The invention relates to a dyestuff mixture of at least 2 reactive dyestuffs, characterised in that it comprises in each case at least one component of the formula 1

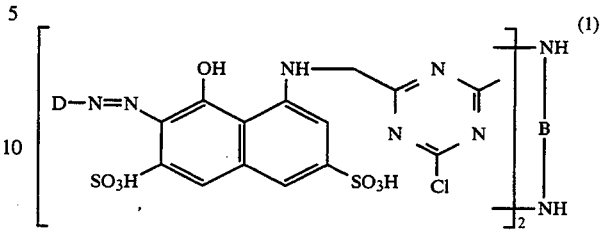

and one component of the general formula (2)

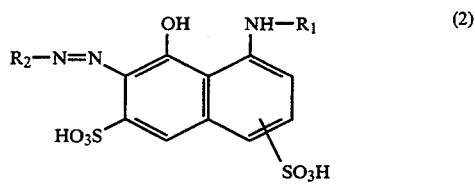

and if appropriate a dyestuff of the formula (3)

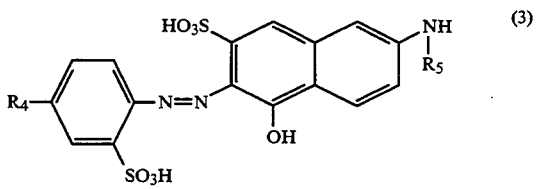

wherein $R_1$ denotes

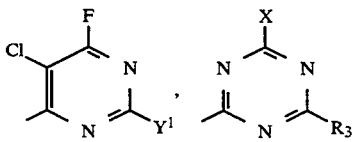

or an acyl radical, in particular of an aromatic carboxylic acid, in particular benzoyl, $R_2$ denotes

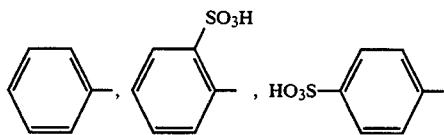

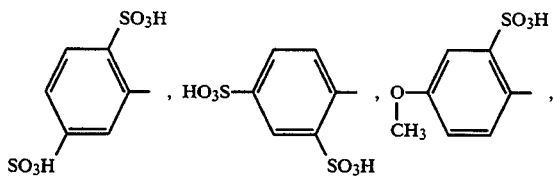

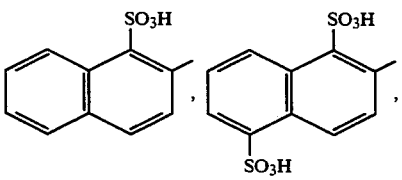

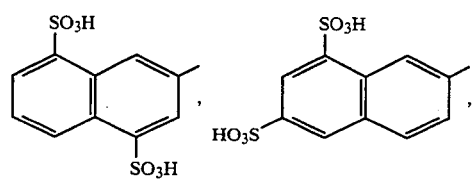
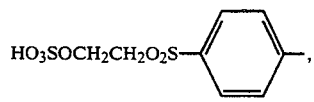
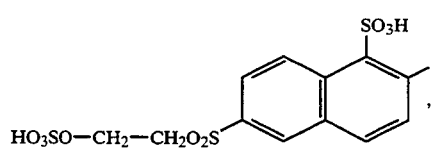
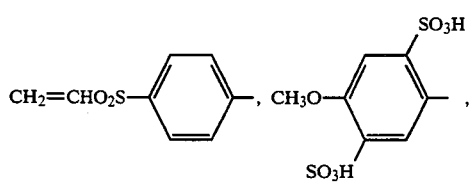
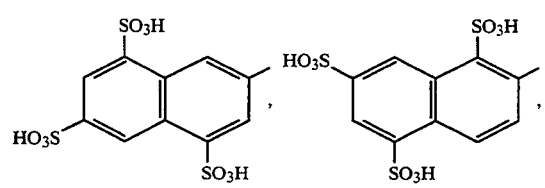
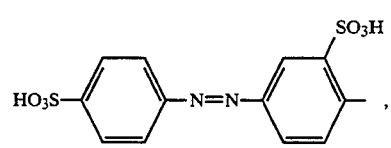
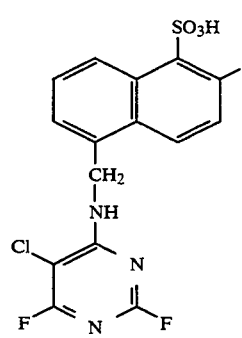
or
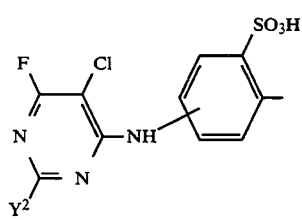
$R_3$ denotes
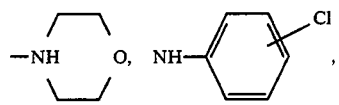
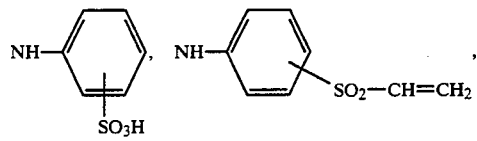
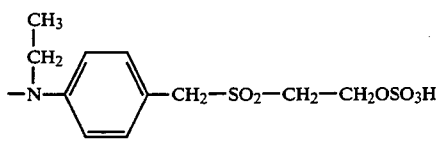
$R_4$ denotes $CH_3-O-$ or
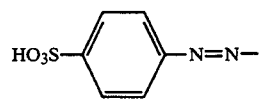
$R_5$ denotes
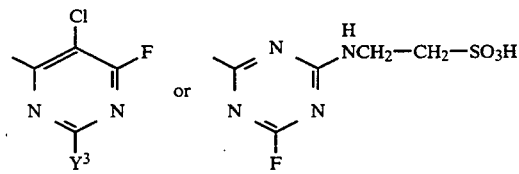
B denotes an aliphatic or aromatic bridge member,
D denotes
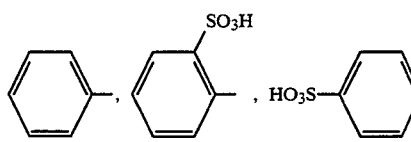
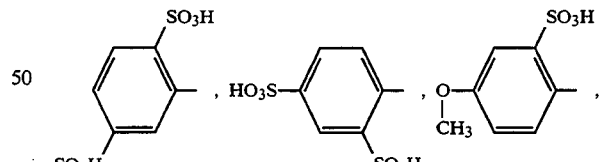
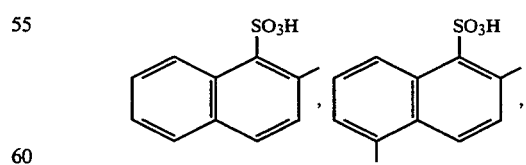
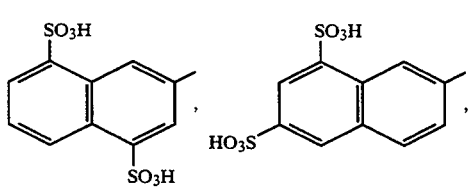

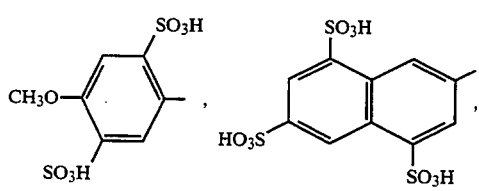

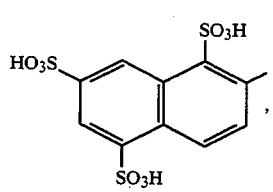

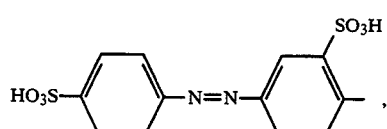

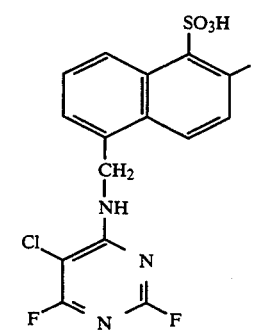

or

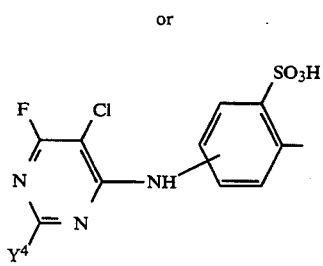

X denotes F or Cl and $Y^1$–$Y^4$ independently of one another denote H or F, and wherein at least one of the radicals $R_1$ and $R_2$ contains a fibre-reactive group.

Particularly preferred dyestuffs (1) are 1.1
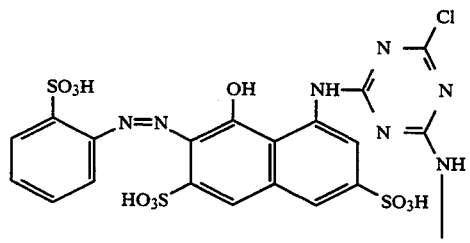

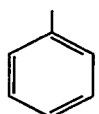

1.2

In a preferred embodiment A, the mixture comprises
70–40 parts of a dyestuff 1,
20–40 parts of a dyestuff 2 and
10–20 parts of a dyestuff 3.

In another preferred embodiment B, the mixture comprises
80–20 parts of a dyestuff 1 and
80–20 parts of a dyestuff 2.

B is, in particular, an alkylene, aralkylene or arylene radical. The term aliphatic bridge member also includes cycloaliphatic radicals. B can thus be a straight-chain or branched $C_1$–$C_{10}$-alkylene radical; an alkylene radical having 2 to 6 carbon atoms, for example ethylene, propylene, butylene, hexylene or cyclohexylene, is particularly suitable. An arylene radical B is, for example, a naphthylene radical, the radical of a diphenyl or stilbene or, in particular, a phenylene radical. An aralkylene radical B is, in particular, a benzylene radical. The radical B can contain further substituents, for example halogen atoms, such as fluorine, chlorine and bromine, alkyl groups having 1 to 4 carbon atoms, such as methyl, ethyl and propyl, alkoxy groups having 1 to 4 carbon atoms, such as methoxy, ethoxy, propoxy and isopropoxy, carboxyl or sulpho. B is preferably $C_{2-6}$-alkylene or optionally substituted phenylene. The ethylene radical, the phenylene radical and the sulphophenylene radical are preferred.
A particularly preferred mixture A comprises the following dyestuffs:
| Group | Formula | Dyestuff No. |
|---|---|---|
| 1 | | 1.1 |
| 2 | | 2.1 |
| 3 | | 3.1 |
A particularly preferred mixture B comprises the following components:
Group 1
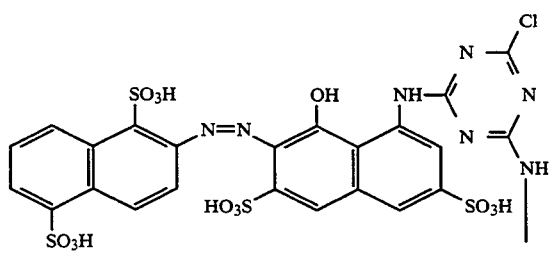
1.2

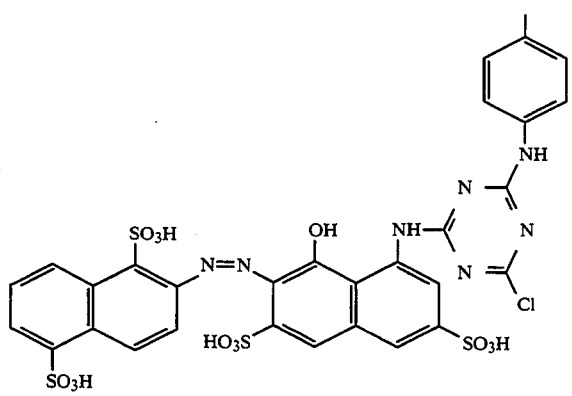

Group 2

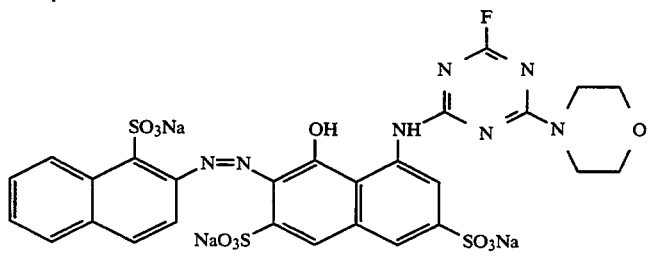

2.2

EXAMPLE 1

100 parts of knitted cotton goods are treated at 30° C. with 1000 parts of an aqueous dye liquor which comprises
4 parts of a formulated red mixture comprising
 15 parts of dyestuff 3.1,
 15 parts of dyestuff 2.1 and
 70 parts of dyestuff 1.1
and
 ½ part of sodium bicarbonate,
 50 parts of sodium chloride and
 20 parts of sodium carbonate (anhydrous)
in dissolved form.

After uniform distribution of the dyestuff over the fibre material at 30° C. over a period of 45 minutes, the liquor is heated to 60° C. in the course of 30 minutes and treated at this temperature for 90 minutes, with vigorous agitation of the goods and good circulation of the liquor. Thereafter, the liquor is drained off and the goods are rinsed twice at 50° C. and twice at 80° C. The bath is then topped up with fresh liquor and heated to 98° C. After 10 minutes, the liquor is drained off and the goods are treated at 98° C. again for 10 minutes. The liquor is then drained off and the goods are rinsed cold.

A brilliant red dyeing having good fastness properties is obtained.

EXAMPLE 2

100 parts of knitted cotton goods are treated on a short liquor jet at 30° C. with 400 parts of an aqueous liquor which comprises
 3 parts of a red mixture comprising:
  20 parts of dyestuff 3.1,
  20 parts of dyestuff 2.3 and
  60 parts of dyestuff 1.1
and
 0.5 part of sodium bicarbonate,
 15 parts of sodium carbonate (anhydrous) and
 30 parts of sodium chloride
in dissolved form.

Dyestuff 2.3 has the following formula

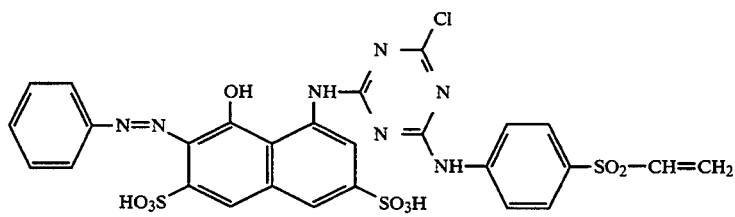

After treatment at this temperature for 30 minutes, the goods are heated at 60° C. for 30 minutes and dyed at this temperature for a further 90 minutes, with vigorous circulation of the liquor and agitation of the goods.

The liquor is then drained off and the goods are rinsed twice at 50° C. and twice at 80° C., and treated at the boiling point twice for in each case 10 minutes. They are then rinsed cold.

A very clear red dyeing having good fastness properties is obtained.

EXAMPLE 3

100 parts of knitted cotton goods and 2 parts of reactive dyestuff mixture are added to 1000 parts of an aqueous dye liquor at 30° C. The mixture comprises in each case 1 part of the dyestuff 1.2 and of the dyestuff 2.2.

When the dyestuff mixture has been distributed uniformly in the liquor and on the cotton, 50 parts of sodium chloride are added to the dye liquor, and 20 parts of sodium carbonate are then added. This dye liquor is heated to 80° C. in the course of 30 minutes, with vigorous agitation of the liquor and goods, and is left at this temperature for 30 minutes.

The liquor is then drained off and the goods are rinsed twice at 50° C. and twice at 80° C. They are then soaped at the boil for 15 minutes and rinsed cold.

A level red dyeing having good fastness properties is obtained.

If the individual dyestuffs of the dyestuff mixtures are used for dyeing, the fixing curves shown in FIG. 1 result.

After addition of the fixing agent at 30° C. the more reactive dyestuff immediately starts to react with the cellulose fibre.

When the main reaction slows down, the heating-up phase to the final temperature of 60° C. starts, during which renewed acceleration of the reaction is observed.

A short time after 60° C. is reached, the fixing curve passes into the horizontal part; the dyeing has ended.

The less reactive dyestuff initially reacts slowly with the fibre under the starting conditions chosen. During the heating-up phase, however, a distinct increase in the rate of reaction occurs.

If the dyeing is carried out with a mixture of the dyestuffs 1.2 and 2.2, the individual components in the mixture show a more harmonious absorption process compared with the typical dyestuff, that is to say in the mixture claimed, under the same fixing conditions, the dyestuff which is slower to react is fixed faster than corresponds to its typical fixing properties.

We claim:

1. A dyestuff mixture containing at least 2 reactive dyestuffs, comprising at least 80–20 parts of the dyestuff of formula 1

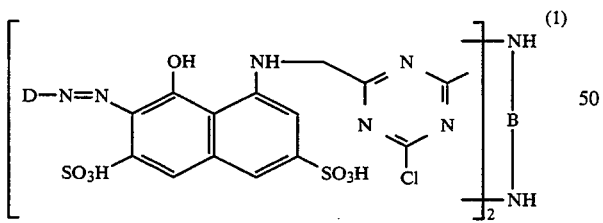

and 20–80 parts of the dyestuff of formula 2

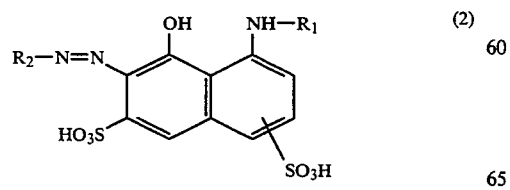

wherein
R₁ denotes

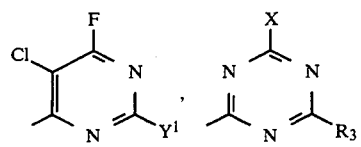

or an acyl radical of an aromatic carboxylic acid,
R₂ denotes

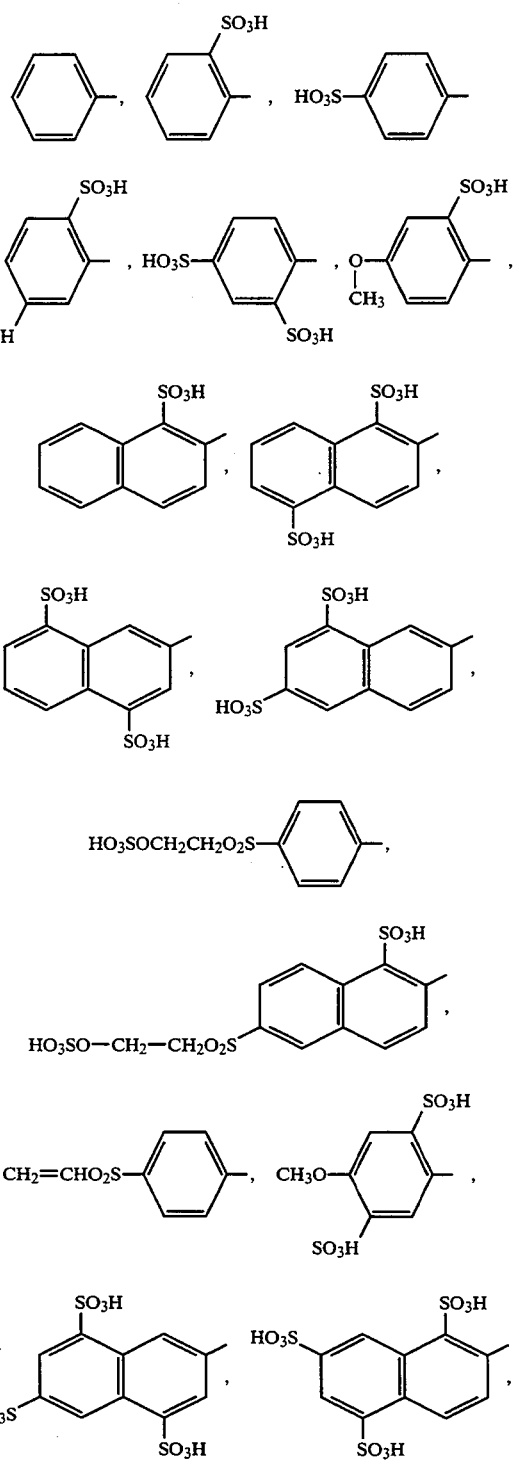

-continued

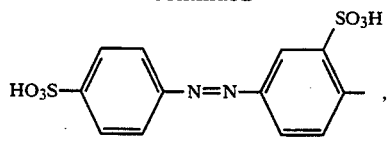

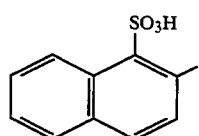

or

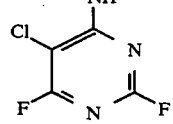

R₃ denotes

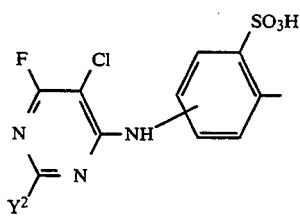

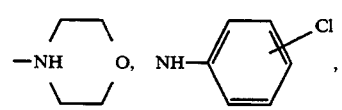

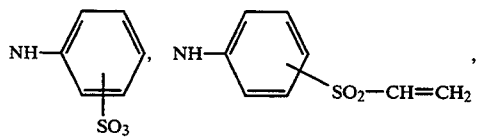

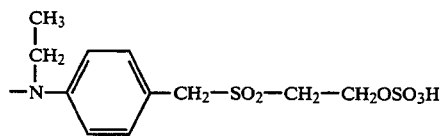

or

B denotes a $C_1$–$C_{10}$-alkylene radical or substituted or unsubstituted a naphthylene, diphenyl, stilbene, phenylene or benzylene radical, wherein said substituents are selected from the group consisting of halogen, $C_1$–$C_4$ alkyl, $C_1$–$C_4$ alkoxy, carboxyl and sulfo, D denotes

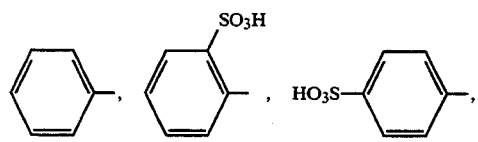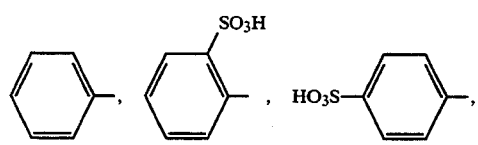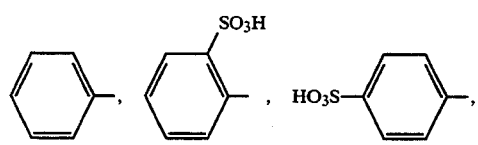

-continued

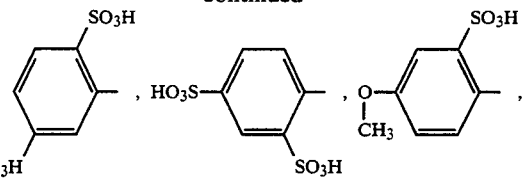

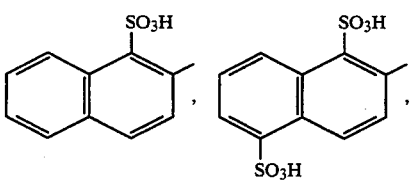

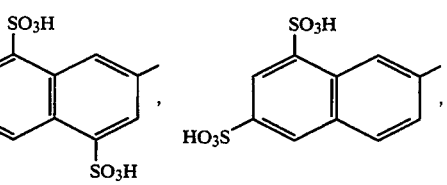

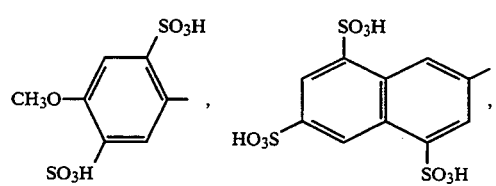

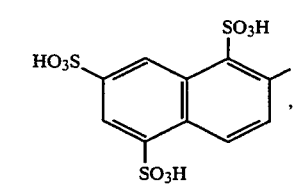

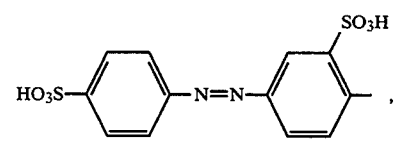

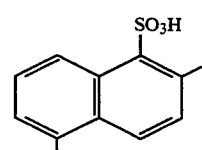

or

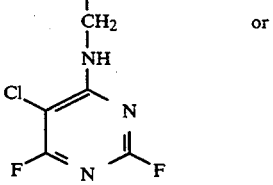

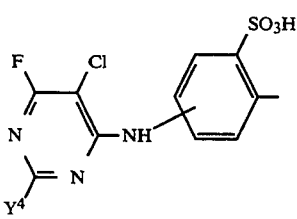

X denotes F or Cl and
$Y^1$–$Y^4$ independently of one another denote H or F, and wherein at least one of the radicals $R_1$ and $R_2$ contains a fibre-reactive group.
2. The dyestuff mixture according to claim 1, wherein it additionally comprises 10–20 parts of a dyestuff of the formula
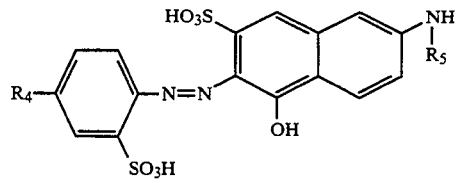 (3)
wherein
$R_4$ denotes $CH_3$—O— or
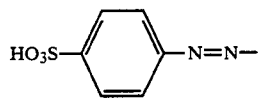
and
$R_5$ denotes
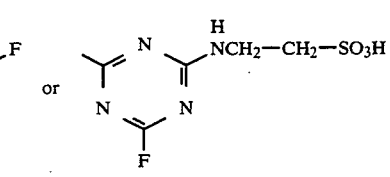
3. The dyestuff mixture according to claim 1, wherein it comprises the following dyestuffs:
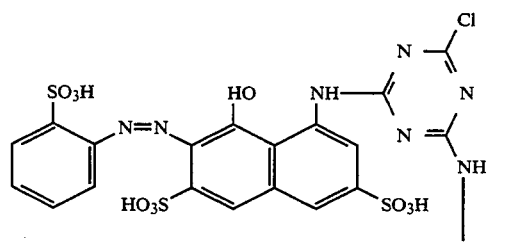
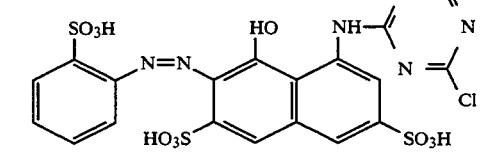
and
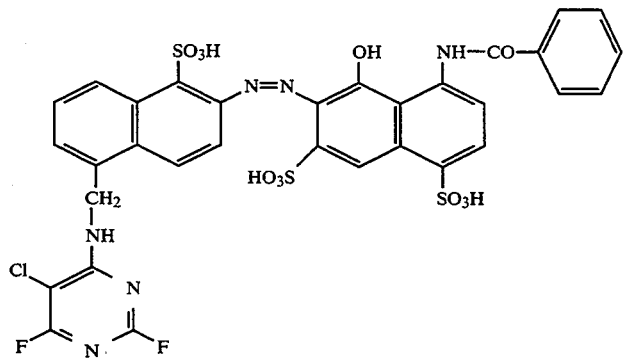

-continued

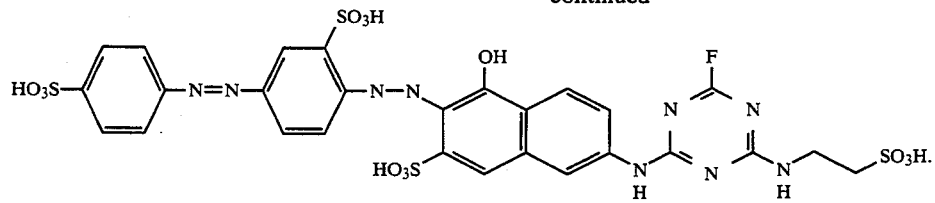

4. The dyestuff mixture according to claim 1, wherein it comprises the following compounds:

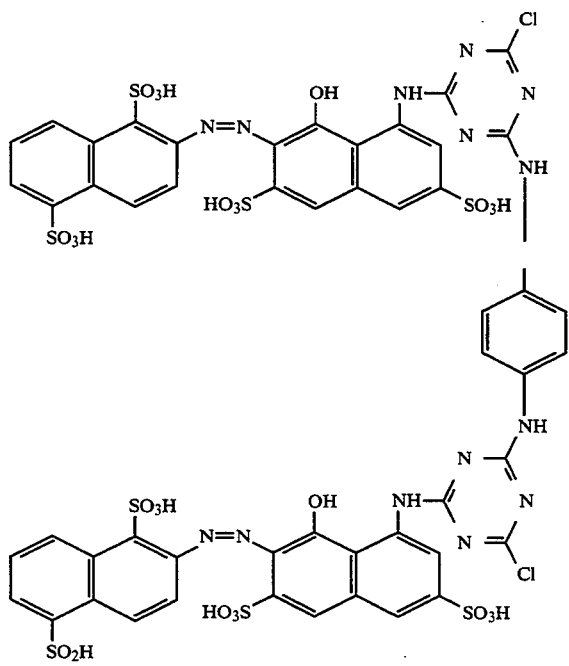

and

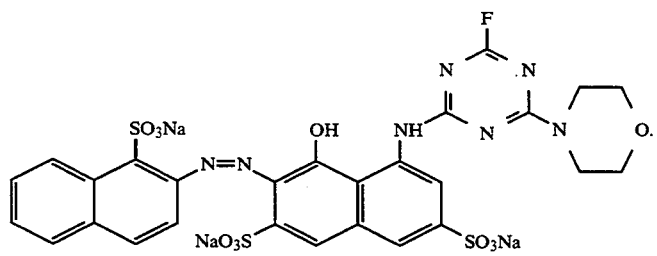

5. The dyestuff mixture according to claim 1, wherein the dyestuff mixture comprises 1–50 parts of an inorganic salt in 100 parts of mixed dyestuff.

6. The dyestuff mixture according to claim 1, wherein the mixture comprises 1–5 parts of an inorganic buffer per 100 parts of the mixed dyestuff and has a pH of 6.5 to 7.5.

7. The dyestuff mixture according to claim 1, wherein the mixture comprises 0.5–10 parts of a commercially available organic anionic dispersing agent.

8. The dyestuff mixture according to claim 1, wherein the mixture comprises 0.5–5 parts of a commercially available dust removal agent.

9. The dyestuff mixture according to claim 1, wherein the mixture is a liquid mixture.

10. The mixture according to claim 1, wherein $R^1$ is benzoyl.